Patented May 13, 1952

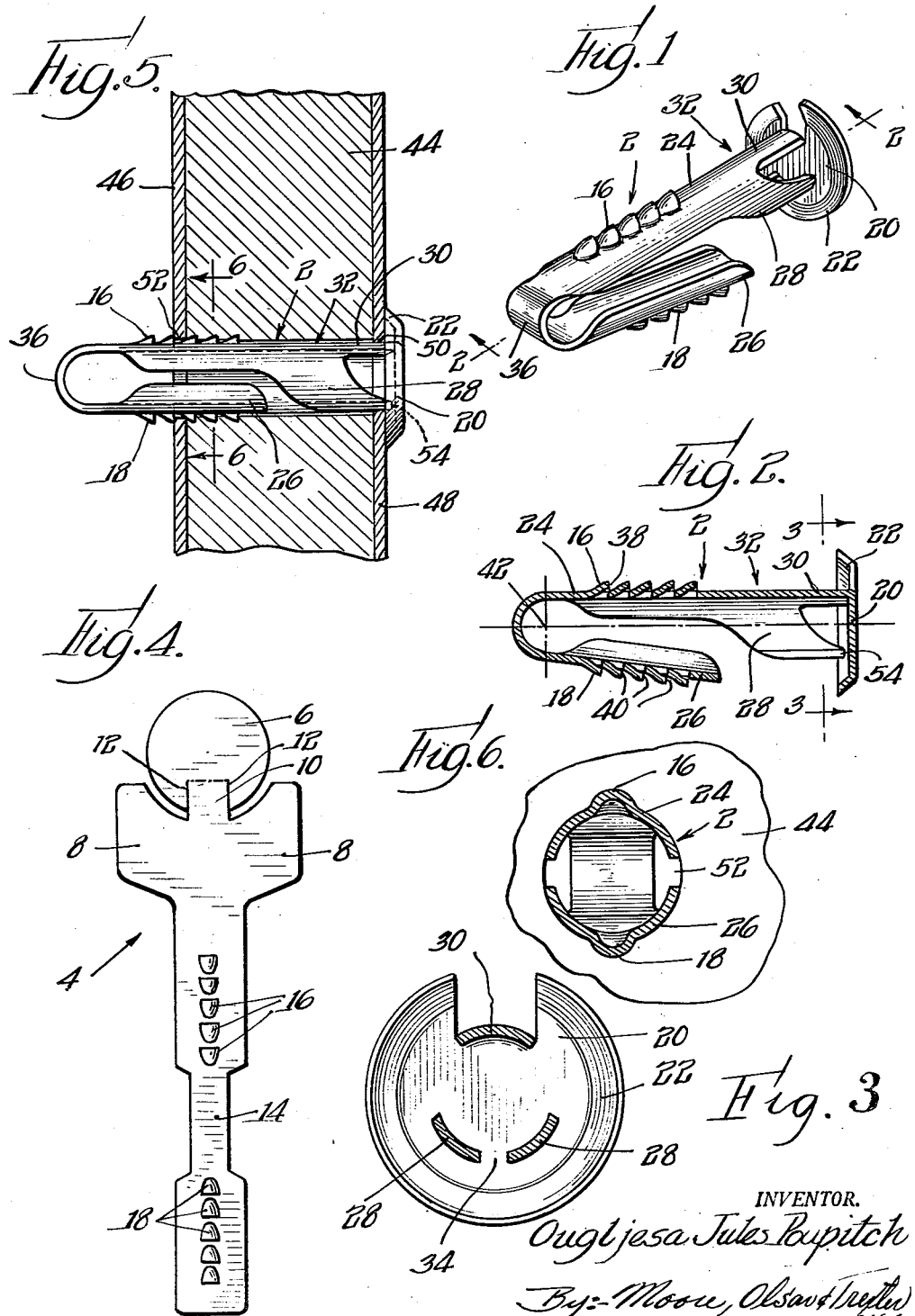

2,596,940

UNITED STATES PATENT OFFICE 2,596,940

DRIVE FASTENER

Ougljesa Jules Poupitch, Chicago, Ill., assignor to Illinois Tool Works, Chicago, Ill., a corporation of Illinois Application May 17, 1946, Serial No. 670,610

4 Claims. (Cl. 85—5)

This invention relates to fastening devices and has for its object the provision of a new and improved form and arrangement of parts in devices of this type which is particularly adapted to be made from sheet metal.

The invention contemplates a fastener particularly adapted for securing compressible insulation material to a metal panel or support, or between two metal panels.

More particularly the invention contemplates a one-piece sheet metal fastener which is easier to insert through compressible material and a subjacent panel; which is more effective in securing the compressible material to the panel; which is more effective to secure compressible materials or pads of different thicknesses to a supporting panel; and which is so constructed as to have substantial advantage in regard to strength, ease and cheapness of manufacture, effective holding power and adaptability for use under different conditions and permitting greater tolerances in the size of openings and thickness of parts into which the fastener is inserted and which are secured by the fastener.

The new and improved device by which the several objects have been attained comprises a single piece stamped from flat sheet metal and subsequently so shaped as to provide rugged head and shank sections, of which the head is additionally strengthened by portions of the shank section so as to facilitate the driving of the fastener into its clamping position, and of which the shank has an integral entering or pilot end and portions which are relatively yieldable and provided with rigid tongues, teeth or projections facilitating the relative flexure of the portions and engaging the secured parts firmly to hold the fastener and the secured parts against relative movement.

The device is preferably formed from sheet metal stock with its body portion in tubular form so as to provide a maximum of strength and with a laterally deflectable portion or arm extending at an acute angle in relation to the main body portion and joined to the main body portion by an integral-entering or pilot end which is substantially flat in cross section, permitting ready deflection of the laterally deflectable portion.

It is another object of the invention to improve devices of this type in sundry details hereinafter pointed out. The preferred means by which the several objects have been attained are illustrated in the accompanying drawing, in which—

Figure 1 is a view in perspective of a new and improved fastening device;

Figure 2 is a view in longitudinal section taken along the line 2—2 of Figure 1;

Figure 3 is a view in cross section taken along the line 3—3 of Figure 2;

Figure 4 is a plan view of a sheet metal blank from which the fastening device may be readily formed;

Figure 5 is a view in section showing the fastening device in position to secure a dash silencer or insulating pad to a dash panel and an overlying or clamping panel; and Figure 6 is a view in cross section taken substantially along the line 6—6 of Figure 5.

The new and improved fastening device 2 (Figures 1 to 3, 5 and 6) is preferably formed from a blank 4 (Figure 4) which is stamped or cut from a strip or plate of sheet metal by any suitable method or apparatus. The blank 4 comprises a preferably circular end portion or disk 6 from which extends an elongated body portion having oppositely disposed, laterally extending wing portions 8 in spaced, circumjacent relation to the disk 6 to which the body portion is integrally joined by a neck portion 10 which extends into the disk and is formed by spaced incisions or cuts 12 through the disk. The body portion is also formed, in spaced relation to the wings 8, with a reduced section or portion 14 and rigid tongues, teeth or projections 16 and 18 stamped from the body portion adjacent to, but on opposite sides of, the reduced section 14.

In order to form the fastener from the blank 4, the latter is subjected to shaping operations which serve to dish the end portion or disk 6 of the blank and provide a generally circular head portion 20 having a strengthening rim 22. The body portion, except for the section 14, is pressed throughout its length to provide part-circular, rigid shank sections 24 and 26. The wings 8 are so shaped as to provide part-circular shank sections or wings 28 which, with the part-circular shank section 24 and a part-circular neck section 30, formed from the neck portion 10 of the blank, provide a substantially tubular shank section or portion 32 for snugly fitting a circular aperture in one of the parts to be joined and with the head forming a substantially water tight closure for the aperture.

It should be noted that the free, axially extending edges of the wing sections 28 of the shank are spaced apart to form a slot 34 between them, as shown in Figure 3, so that the wing sections may yield toward each other to accommodate themselves to an aperture which, by reason of permitted tolerances in the forming of the aperture and the fastener, is of less diameter than the tubular section 32.

The wing sections 28 also extend axially into close juxtaposition to the under surface of the circular portion 20 of the head of the fastener, as shown in Figures 2 and 5, so as to support the head as the fastener is driven into fastening position.

The reduced flat section 14 of the blank is bent upon itself substantially midway thereof to form the pilot or integral entering end 36. The pilot end 36 is so shaped that the free shank section 26 diverges from the shank section 24 toward the head of the fastener.

It should be noted that in forming the pilot or entering end 36 the section 14 of the blank is bent about an axis normal to the longitudinal axis of the shank section 20 and the tubular shank section 32, so that in the applied position of the fastener, the longitudinal axis of the shank section 26 will be coincident or substantially coincident with the axis of the section 24, as shown in Figure 6.

The rigid teeth 16 and 18, as formed in the blank 4, face in opposite directions so that, on bending of the section 14 of the blank to form the pilot or entering end 36, these rigid teeth face in the same direction, that is, toward the head of the fastener and provide a plurality of work engaging shoulders 38 and a plurality of work engaging shoulders 40 to prevent withdrawal of the fastener. It should be noted that these rigid teeth or tongues are formed by incising or cutting the sheet metal along straight lines perpendicular to the edge of the strip and then pressing or stamping the material outwardly on one side of the slot or cut so that each tongue is integrally attached to the sheet metal on the sides as well as the bottom of the tongue and is, therefore, rigid and unyielding.

It should be noted that the pilot or entering end 36 is well-rounded or curved to form a substantially circular arc about an axis 42 which is coincident or substantially coincident with the longitudinal axis of the part-circular shank sections 24 and 32 of the fastener, as shown in Figure 2. This well-rounded or curved pilot entering end 36 facilitates ready passage of the fastener through the insulating material or pad.

As shown in Figure 5, the fastener 2 is utilized to clamp the compressible insulating material or pad 44 to a dashboard plate or panel 46 and between that panel and a clamping or covering panel 48. The pad 44 and each of the panels 46 and 48 are provided with mating openings or apertures to receive the fastener 2.

The fastener 2 is first introduced into the opening 50 in the panel 48, the pilot or entering end 36 properly positioning the fastener with respect to the opening 50. As the fastener is pressed or driven inwardly, the wall of the opening engages and causes lateral inward deflection of the shank section 26 to a position in which the axis of the shank section 26 is substantially coincident with the axis of the shank section 24, as indicated in Figure 6.

The section 26 is preferably of a length substantially equal to, or greater than the thickness of the pad 44 so that the wall of the opening 50 will maintain the section 26 in its inner deflected or tensioned position until the pilot or entering end has passed through the opening 52 in the work support or panel 46. Thereafter, the wall of the opening 52 maintains the shank section 26 in its inwardly deflected or tensioned position while the fastener is positioned or driven to its final position, as shown in Figure 5. Thus ready passage of the fastener through the compressible insulating material or silencer pad is assured.

It should be noted that the tongues 16 and 18, by reason of the fact that they are integrally connected to the sheet metal stock, except along the shoulder forming edges which face the head of the fastener, have smooth, cam-like surfaces which facilitate their passage through the insulating material or pad 44. The tension created in, and the resilience of, the pilot or entering end 36 cause the shoulders 38 and 40 of the tongues to be projected over the peripheral edge of the opening 52 in the supporting work piece or panel 46 and, since the tongues are rigid, they prevent any axial movement or vibration of the fastener.

The plurality of tongues 16 and 18 make it possible for the fastener properly to secure panels or pads of different thicknesses with the same degree of rigidity. As the fastener is driven to final position, the pad 44 is compressed. The plurality of tongues on the fastener secure the proper rigidity of fastening, regardless of the extent to which the material is compressed.

The bending of the head about its point of connection to the neck section 30 of the fastener, as the fastener is driven into the work, is limited by its engagement with the free edges and ends 54 of the wing sections 28 of the shank and, therefore, shearing of the head from the shank or its deformation to such an extent that the head will not seat in flush-tight relation to the work support or panel 48, is prevented. By reason, however, of the slight spacing between the edges 54 and the head, the head is sufficiently resilient or yieldable with respect to the shank to accommodate itself to the surface of the panel 48. Thus if, by misalignment of the openings in the panels and pad, the shank section should be inclined somewhat, the head of the fastener nevertheless will lie in flush-tight relation to the surface of the panel 48.

It will thus be seen that the invention provides a fastener which is particularly adapted for securing compressible material or pads of different thicknesses to a supporting panel; which is so constructed as to have substantial advantage in regard to strength, and ease or cheapness of manufacture; and which permits greater tolerances in the size of openings and thickness of parts into which the fastener is inserted and which are secured by the fastener.

While certain specific embodiments have been disclosed herein, it will be apparent that the invention is by no means limited to the details of construction herein disclosed but is capable of other modifications and changes without departing from the spirit and scope of the appended claims.

This invention is hereby claimed as follows:

1. A fastener comprising a head part and a stud part formed from a one-piece sheet metal blank, the head part being formed from one end of the blank and joined to the stud part by an integral connecting portion substantially perpendicular to the plane of the head part, the line of connection of the head part and stud portion lying well within the peripheral margin of the head part, the opposite end portion of the blank extending toward the head part in diverging relation to an intermediate portion of the blank to form spaced stud sections relatively yieldable toward each other and integrally joined by a resilient pilot section, said stud part having laterally projecting wing sections subjacent the head and between the stud section formed from said other end portion of the blank and the head part to provide abutment means for the head part.

2. A fastener as set forth in claim 1, wherein the resilient pilot section is narrowed with respect to the remaining portion of the shank.

3. A fastener as set forth in claim 1, wherein at least one of the stud sections is provided with shoulders adapted to cooperate with the head part in securing the fastener in a work piece.

4. A fastener as set forth in claim 1, wherein the stud sections are oppositely concaved to present a substantially tubular stud part.

OUGLJESA JULES POUPITCH.

REFERENCES CITED

The following references are of record in the file of this patent:

UNITED STATES PATENTS

| Number | Name | Date |
|---|---|---|
| 256,117 | Bray | Apr. 11, 1882 |
| 558,349 | Brunka | Apr. 14, 1896 |
| 623,427 | Richards | Apr. 18, 1899 |
| 727,111 | Duffy | May 5, 1903 |
| 1,830,460 | Berge | Nov. 3, 1931 |
| 1,996,722 | Gilbert | Apr. 2, 1935 |
| 2,077,120 | Lombard | Apr. 13, 1937 |
| 2,100,017 | Van Uum | Nov. 23, 1937 |
| 2,130,597 | Oldham | Sept. 20, 1938 |
| 2,138,195 | Place | Nov. 29, 1938 |
| 2,142,429 | Wiley | Jan. 3, 1939 |
| 2,144,140 | Batcheller | Jan. 17, 1939 |
| 2,252,932 | Johnson | Aug. 19, 1941 |
| 2,267,873 | Place | Dec. 30, 1941 |
| 2,391,298 | Davis | Dec. 18, 1945 |
| 2,428,338 | Poupitch | Sept. 30, 1947 |